Figure 1:
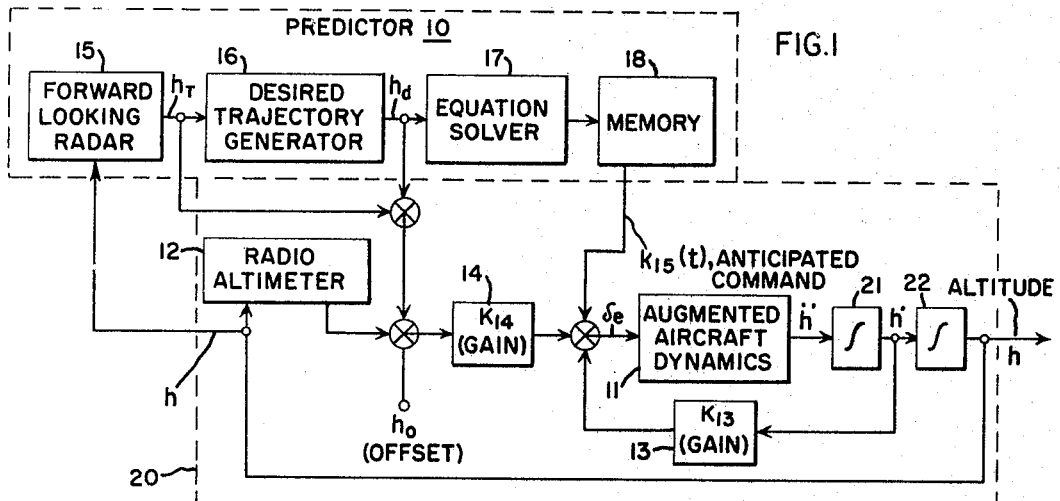

June 20, 1967  F. J. ELLERT ETAL  3,327,306
OPTIMIZED INPUT ADAPTIVE CONTROL METHOD AND SYSTEM
Filed Dec. 31, 1964  3 Sheets-Sheet 1

United States Patent Office 3,327,306
Patented June 20, 1967

3,327,306
OPTIMIZED INPUT ADAPTIVE CONTROL
METHOD AND SYSTEM
Frederick J. Ellert, Scotia, and Charles W. Merriam III,
Ithaca, N.Y., Edwin L. Peterson, Santa Barbara, Calif.,
and Gene Tye, Endwell, N.Y., assignors to General
Electric Company, a corporation of New York
Filed Dec. 31, 1964, Ser. No. 422,654
7 Claims. (Cl. 343—7)

This invention is directed to closed-loop control systems in which the control signals are generated on the basis of predicted system performance and information on future system performance requirements. It is characterized by the optimization of trade-offs of a plurality of desired system performance factors. A prime example of an application of such a control system is in an aircraft terrain following pitch control channel.

In such a pitch control channel, the functional objects include: keeping the aircraft within a given range of heights over the terrain so as to avoid crashes while maintaining a low altitude at which radar detection is difficult; limiting aircraft vertical velocity to values consistent with the terrain following requirements and aircraft maneuvering capability; and avoiding aircraft vertical acceleration magnitude and frequency which overly stresses the capabilities of the aircraft and the crew.

This is an example of a general area for application of the invention to control systems for controlling the path of an object relative to an irregular surface so as to optimize conformity between the path followed and the surface. The surface can be any measured or stored master surface including mathematical data generating geometrical surfaces or lines. While much effort has been directed to applying the invention to aircraft terrain-following control systems, the invention is useful for closed-loop control systems of a general class, of which the control of the cutter of a machine tool relative to a template is another example.

Closed-loop control systems have inherent limitations on performance. One limitation results from the impossibility of providing infinite response rates. Whether the controlled plant is an aircraft, a machine tool, or some other system, a condition or variable being controlled can be changed at a rate which has a maximum upper limit. Secondly, any control system faces certain constraints which limit the permissible error. In any control system, there is some error relative to a desired value and the design goal is to regulate this error in the best manner consistent with reasonable costs, existing component capabilities, and tolerable performance variations.

One current approach to control system design, particularly in the automatic machine control art, is to arrange for a selected number of machine control operating segments and then select those segments which provide the best approximation of the desired path. For example, a machine controller will have a repertory of a given number of control signal blocks, each of which results in the machine tool following a particular linear or circular line segment. These control signals specify the particular appropriate command signals and select a tool advance rate. Obviously, these control signal blocks are independent of the future path beyond the immediate segment. As such, it is necessary to incorporate the "worse case" design factors. Therefore, this type of control system can never provide optimum system performance. Furthermore, while it can be "adaptive" in the sense that the controller characteristics may be modified on the basis of past and present state conditions, the system is not adaptive in respect to future state conditions. For the purposes here, "adaptive" can be considered the automatic adjustment of information signal processing components in the form of gain changes in D-C amplifiers, digital multipliers, etc., to compensate for changes in environmental conditions, etc. When a machine tool control system operates with a constant rate of machine tool advance, the dynamics of the controlled machine tool can generally be approximated by a series of linear differential equations of the form $$\frac{d}{dt}f_1(x) = f_2(x)$$

However, the control system as a whole introduces additional factors which make the analysis and control apparatus simulation much more difficult in respect to efficient and generalized instrumentation. When the machine tool rate of advance is variable, it is impossible to analyze even the machine tool dynamics by linear relations. The complex interrelationships in control system analysis tend to multiply when factors such as stability, sensitivity to disturbances, variable gain effects, etc., are all considered.

Another example of a control system of interest is the height control channel in a hydrofoil flight control system. These systems have generally relied on height sensors to derive command signals in the controller for controlling the attitude of the control surface in the foil so as to maintain a constant height. In general, collision at the high hydrofoil cruising speeds of the hull with the sea is a catastrophic system failure. It is evident that the use of only present and past height data tends to impose large safety margins and heavy demands on control system instrumentation which are of little value under normal conditions. An obvious step is to utilize a forward looking sensor for additional information. However, the incorporation of the additional data is difficult. If reliance is placed upon sample data signals (such as from selected ranges), the controller can not be properly analytic because of data incompleteness, while serious concern must be given to stability conditions with the additional data. If full data is processed, the complexity of state conditions of possible interest tends to make even laboratory analysis impractically complex.

Accordingly, it is an object of the invention to provide a closed-loop control in which the system performance is optimized through modifying command signals in accordance with information about the desired future performance.

It is another object of the invention to provide a surface following control system in which there is an optimum trade-off between the controlled object response errors and the system constraints.

It is another object of the invention to provide an input adaptive control system which is inherently stable.

It is another object of the invention to provide an input adaptive control system which is relatively insensitive to disturbance factors.

It is another object of the invention to provide an input adaptive controller which is basically linear.

It is another object of the invention to provide an input adaptive controller which is truly linear where the processes being controlled can be reasonably described by a set of linear differential equations.

It is another object of the invention to provide an input adaptive controller which predicts the future performance with considerable accuracy, suitable for real-time monitoring or performance analysis.

It is another object of the invention to provide an input adaptive controller which also generates signals suitable for detecting system errors such as tool wear and sensor drift.

Briefly stated, in accordance with certain aspects of the invention, an optimum linear control system is provided for controlling the path of an object in response to a given set of input signals over a specified future time interval. The invention is characterized by the integration of system signals in such a manner that the response errors and the constraint limits (which dictate the permissible range of system errors) interact to minimize demands on the system components and maximize system performance. This is done with a rigorous and stable trade-off of errors. A predictor is provided which generates signals at successive steps of integration. The inputs to this predictor are derived from the present state of the controlled object and data indicating future requirements. However, these signals, without modification do not allow for either the response errors or system constraints. These factors are introduced first by predictor gains in accordance with the actual response characteristics of the servomechanism and by introducing, in parallel, constraint factors for the system. This permits multilevel interaction between the predicted servomechanism errors and the system constraints to produce optimum performance.

Figure 2:
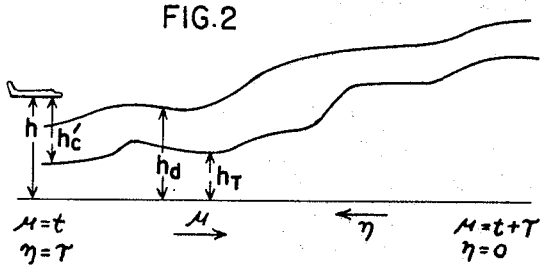
Figure 3:
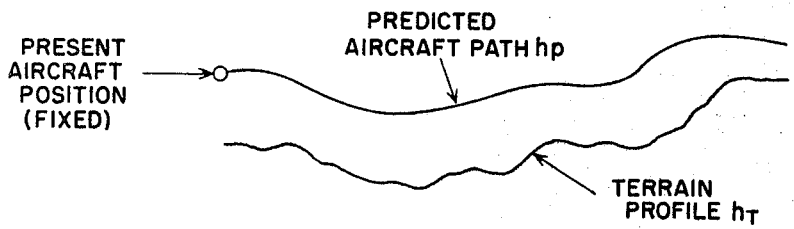
Figure 4:
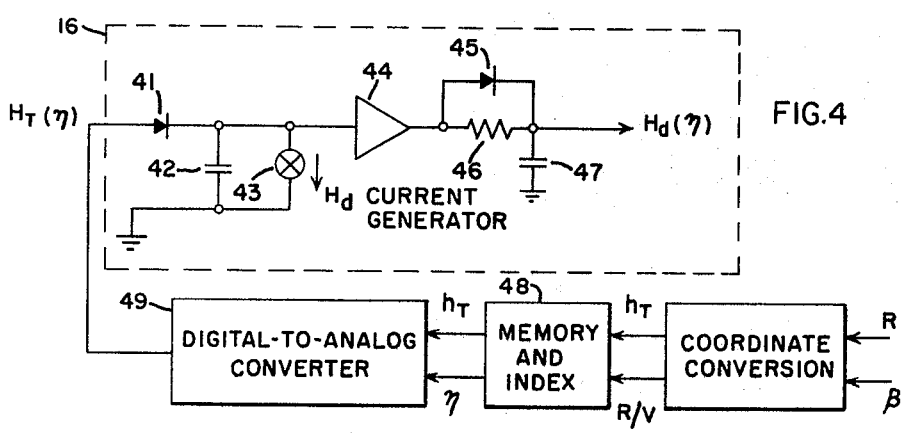
Figure 5:
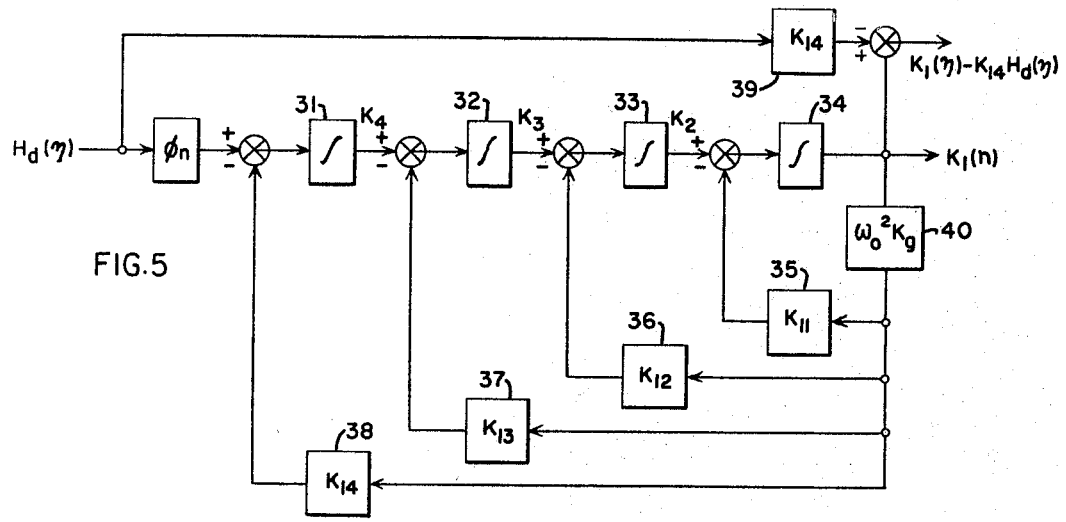

The invention, together with further objects and advantages thereof, may best be understood by referring to the following description taken in conjunction with the appended drawings in which like numerals indicate like parts and in which: FIGURE 1 is a block diagram illustrating a terrain following control system incorporating the invention. FIGURE 2 is a pictorial diagram illustrating the terrain following problem. FIGURE 3 is a pictorial diagram illustrating the operation of the invention. FIGURE 4 is a schematic diagram of a suitable desired trajectory generator for the FIGURE 1 system. FIGURE 5 is a block diagram of an equation solver for the FIGURE 1 system. FIGURES 6, 7, 8 and 9 are diagrams illustrating operation of the FIGURE 1 system.

FIGURE 1 is a block diagram of a preferred embodiment of an aircraft terrain following pitch control system incorporating the invention. It is basically a modification of a self-adaptive pitch control channel 20 of the type disclosed in the Proceedings of the 1961 Western Electronic Show and Convention (WESCON) "Self-Adaptive Control Through Frequency Regulation" by R. G. Buscher, K. B. Haefner, and M. F. Marx; patent application Ser. No. 355,042, "Adaptive Control System and Method," filed Mar. 26, 1964 by Richard G. Buscher and Glenn W. Walker, and patent application Ser. No. 370,277, "Digital Adaptive Control System Sensor," filed May 26, 1964 by Laurel D. Fry. This type of flight control system is self-adaptive in the sense that aircraft performance is monitored to produce signals which adjust the control loop gains so as to insure stability of the servo loop and to maintain the channel response characteristics essentially constant in spite of variations in aircraft parameters due to component aging, and variations in aircraft speed, altitude, weight, and center of gravity. Optimum terrain following is dependent upon the feedback matrix gain values in feedback multipliers 13 and 14. However, it has been found that with the use of a self-adaptive pitch channel having variable forward gain, these feedback gain factors can be kept constant. (The augmented aircraft dynamics 11 includes inner loops of the feedback matrix.) In applying the invention to terrain following, the primary result is the addition of predictor 10 which generates anticipation command signals $k_{15}(t)$. This apparatus includes a forward looking radar to generate signals $h_T$ representing the profile of the terrain along the flight path. These signals are used by generator 16 to generate signals $h_d$ representing the desired trajectory. The heart of the system is the equation solver 17 which analyzes the desired trajectory information as a boundary value problem for $k_{15}(t)$ to provide an optimized trajectory on the basis of aircraft parameters. A key feature of the equation solver 17 is that the derived anticipation command signal $k_{15}(t)$ is derived from an integration of critical performance factors over a future interval. While it is possible to utilize anticipation command signals $k_{15}(t)$ which are fixed during each of successive incremental time intervals and to generate a $k_{15}(t)$ signal for each increment, preferably $k_{15}(t)$ is generated over an extended period (normally determined by the effective range of forward looking radar 15) and the values of $k_{15}(t)$ are stored by memory 18. This is not a real-time computation, but a repetitive calculation of $k_{15}(t)$ over the projected flight path interval. The availability of the predicted flight performance information makes monitoring of control system performance practical. Radio altimeter 12 provides accurate and reliable present altitude data which is useful for improving system performance directly and for monitoring the performance of radar 15, including automatic correction of boresight error as described hereinafter.

The approach selected for this system is based upon the concept that the determination of a desired altitude trajectory $h_d$, and the control of the aircraft are separable problems. Although this will not be entirely true in the resultant system, it will be shown to be a good approximation, and permits considerable simplification in the control system synthesis. In addition, this approach permitted the generation of a desired altitude trajectory to be carried out without the complication of simultaneously considering control system stability. Assume, for the present, that the desired altitude trajectory, $h_d(\mu)$, is known relative to the terrain altitude, $h_T(\mu)$ as shown in FIGURE 2. Present absolute (inertial) altitude is denoted by $h(t)$ and present clearance by $h'_c(t)$. Independent variables $t$ and $\mu$ represent present and future times, respectively, and $\tau$ represents a time proportional to maximum range of the radar. The symbol $(\eta)$ is a time variable running from maximum range (time) to zero range (time).

FIGURE 3 illustrates the ultimate data made available by predictor 10 which is used for display and control. This data includes the measured terrain profile $h_T$ and the predicted aircraft path $h_p$. The latter is a function of the terrain, aircraft characteristics and the desired response characteristics. The desired anticipation command signal is generated by the FIGURE 5 equation solver 17. A primary feature of this equation solver is that its independent time variable is $\eta$ and not real time $t$. The variable $\eta$ runs from the maximum range $t+\tau$ to minimum range $t$ and the solutions are obtained in *reverse time*. The equations solved are as follows:

$$\frac{dK_1(\eta)}{d\eta} = K_2(\eta) - \omega_0^2 K_g K_{11} K_1(\eta), \quad K_1(o) = 0 \quad (1)$$

$$\frac{dK_2(\eta)}{d\eta} = K_3(\eta) - \omega_0^2 K_g K_{12} K_1(\eta); \quad K_2(o) = 0 \quad (2)$$

$$\frac{dK_3(\eta)}{d\eta} = K_4(\eta) - \omega_0^2 K_g K_{13} K_1(\eta); \quad K_3(o) = 0 \quad (3)$$

$$\frac{dK_4(\eta)}{d\eta} = \phi_h H_d(\eta) - \omega_0^2 K_g K_{14} K_1(\eta); \quad K_4(o) = 0 \quad (4)$$

The equation solver is mechanized by the use of four series connected analog computer integrators 31–34 and a set of gain devices 35–40. In order that the solution be useful, the mechanization must be fast-time scaled. A solution must be obtained before the aircraft's velocity has caused a significant change in its position. Obtaining a solution to Equations 1 through 4 is equivalent to flying a simulated model of the actual aircraft dynamics backwards over the desired altitude trajectory. The difference between the solution to Equations 1 through 4, $K_1(\eta)$, and the terrain-altitude, $H_T(\eta)$ is then a command clearance which lags the required clearance in reverse time, and therefore leads the required clearance in forward time. Moreover, the time varying solution is not only valid for present time, but for a distance into the future consistent with the accuracy of the radar-measured terrain. This latter conclusion is particularly significant in that it is possible to obtain a continuous command input even though the basic information (forward terrain)

is sampled periodically (at radar frame time). Conveniently, the integrators 31–34 are conventional electronic analog integrators and the gain devices 35–40 are electronic analog amplifiers which are adjusted in accordance with the desired gain. The input to the equation solver 17 is an analog D-C signal derived from the desired trajectory generator 16 shown in FIGURE 4. The positive slope of the desired trajectory signal is limited to a maximum value $\dot{H}_L$ by the limiting circuit 41–43 (in accordance with the fixed adjustment of current generator 43) and the upper corners of the trajectory are smoothed by the lag network 45–47. Isolation between the lag and limiting circuits is provided by an isolation amplifier 44. The terrain altitude profile $h_T$ data from the forward looking radar 15, such as type AN/ASG 14 radar, is preferably processed by glass delay lines comprising the digital storage device 48 and converted to analog form by a digital-to-analog converter 49. The anticipation command signal, $k_1 - K_{14}h_d(t)$ provided by the equation solver, covering a future interval of time, is then applied to the memory 18 and integrated with the standard portions 11–13 of the overall control system as shown in FIGURE 1.

The best mechanization for predictor 10 is largely dependent upon the aircraft velocity which primarily determines the required data access rate. Preferably, for an aircraft having a representative velocity of 1000′/sec., a sequential digital store generating forward terrain height data with a 0.1/sec. sample time is employed. Radar height signals covering ten miles are stored in five 200 microsecond delay lines having five megacycle bit rates. Ten bit binary words provide ten foot resolution over a range of ten thousand feet in altitude and enable sampling at one hundred feet intervals along the flight path. By synchronizing the memory data sequencing with the equation solver 17, an analog signal is indexed and generated ten times a second. Because this analog signal is a function of the actual lag characteristics of the simulated aircraft performance, it is directly available as the desired lead signal for the flight control channel. Accordingly, memory 18 holds the anticipation signal $$k_1(t) - K_{14}h_d(t)$$

between recalculations.

The design of the equation solver 17 is not an independent part of the control system. The details of the equation solver 17 form an integral part of the control system as a whole. The control system is arranged and adjusted in accordance with the optimization of system performance. First, an instantaneous error measure is derived in the following form:

$$H\{h(t), \dot{h}(t), \ddot{h}(t), \theta(t), m(t)\} = \phi_h[h_d(t) - h(t)]^2 + \phi_g[\ddot{h}(t)]^2 + \phi_{\dot\theta}[\dot\theta(t)]^2 + [m(t)]^2 \quad (5)$$

where $h(t)$, $\ddot{h}(t)$, $\dot\theta(t)$ are the variable plant states, aircraft height, height acceleration, and pitch rate, respectively, and $\phi_h$, $\phi_g$ and $\phi_{\dot\theta}$ are weighing factors which are a direct expression of the control system tradeoffs. The nature of an optimal control signal is such that if an optimal $m(t)$ is found (where, $t \leq \sigma \leq t+T$) to minimize $$e[h(t), \dot{h}(t), \ddot{h}(t), \dot\theta(t), m(t)]$$

then it also minimizes $$e[h(\mu), \dot{h}(\mu), \ddot{h}(\mu)\dot\theta(\mu), m(\mu)]$$

where $\mu$ is a dummy time variable for future time and $t \leq \mu \leq t+T$. Therefore, it can be stated that:

$$E[h(\mu), \dot{h}(\mu), \ddot{h}(\mu), \dot\theta(\mu), \mu] = \min_{m(\sigma)} \int_\mu^{t+T} H[h(\sigma), \dot{h}(\sigma), \ddot{h}(\sigma), \dot\theta(\sigma), m(\sigma)]d\sigma \quad (6)$$

By implication, therefore, $$\min_{m(\mu)} \left\{ H(\mu) + \frac{dE(\mu)}{d\mu} \right\} = 0 \quad (6a)$$

E is then expanded into a truncated power series, that is, a parametric expansion is performed on the basis of parameters $k_0$, $k_1$, etc. From the error Equation 5 and the standard linear model of aircraft dynamic processes, E is expressed as follows:

$$E[h, \dot{h}, \ddot{h}, \dot\theta, \mu] = k_0 - 2k_1\ddot{h} - 2k_2\dot{h} - 2k_3 h - 2k_4\dot\theta + k_{11}(\ddot{h})^2 + k_{22}(\dot{h})^2 + k_{33}(h)^2 + k_{44}(\dot\theta)^2 + 2k_{12}\ddot{h}\dot{h} + 2k_{13}\ddot{h}h + 2k_{14}\ddot{h}\dot\theta + 2k_{23}\dot{h}h + 2k_{24}\dot{h}\dot\theta + 2k_{34}\dot\theta h \quad (6c)$$

Specifically, one must construct a system which generates a control signal, $m(\sigma)$, over all future time, $\mu \leq \sigma \leq t+T$, such that the integral of the error measure Equation 5 is an absolute minimum. The value of this integral error measure is E and is an explicit function of all the pertinent conditions existing in the system at present time (initial conditions). The variable $\mu$, represents all possible initial times from present time, $t$, to $t+T$.

It is obvious that it is not possible to independently choose each of the state-variables, $h(t)$, $\ddot{h}(t)$, and $\dot\theta(t)$ in order to minimize the integral error measure, Equation 6. In fact, the only choice available is the control signal $m(t)$. The manner in which each of the state-quantities varies relative to the others is fixed by the aircraft equations of motion, or equivalently, the aircraft transfer function. The particular control signal which indeed minimizes the integral Equation 6 must therefore account for the specific dynamics of the aircraft being controlled. Thus, a solution to the control system synthesis problem as expressed by Equation 6 requires an aircraft transfer function.

The effort required to solve the synthesis problem posed by Equation 6 increases with the complexity of the aircraft transfer function, but a solution is practicable for any degree of complexity as long as linearity remains a valid assumption.

The longitudinal motions of an aircraft are conventionally described by three linearized, rigid body equations, assuming small perturbations about straight and level flight conditions. For purposes of deriving the $k$-equations, it is convenient, though not essential, to make certain approximations which simplify the calculations.

Of particular interest are the approximate airframe transfer functions relating pitch angle to stabilator deflection, and vertical acceleration to stabilator deflection. These transfer functions, obtained from the complete equations, are as follows:

$$\frac{\theta}{\delta} = \frac{A_\theta\left(S+\frac{1}{T_{\theta_1}}\right)(1+ST_{\theta_2})}{(S^2+2\xi_p\omega_p S+\omega_p^2)(S^2+2\xi_{sp}\omega_{sp}S+\omega_{sp}^2)} \quad (7)$$

$$\frac{\ddot{h}}{\delta} = \frac{A_h S\left(S+\frac{1}{T_{h_1}}\right)(1+ST_{h_2})(1+ST_{h_3})}{(S^2+2\xi_2\omega_p S+\omega_p^2)(S^2+2\xi_{sp}\omega_{sp}S+\omega_{sp}^2)} \quad (8)$$

The short period frequency and damping are represented by $\omega_{sp}$ and $\xi_{sp}$ respectively, and the path time constant $T_{\theta_2}$. The terms containing $1/T_{\theta_1}$, $1/T_{h_1}$, $\xi_p$ and $\omega_p$ describe the phugoid mode. This mode may be disregarded for the purposes of the optimization study since the $1/T_{\theta_1}$, $1/T_{h_1}$, and $\omega_p$ are all extremely small compared with the other factors. If this is done the two transfer functions become:

$$\frac{\theta}{\delta} = \frac{A_\theta(1+ST_{\theta_2})}{S(S^2+2\xi_{sp}\omega_{sp}S+\omega_{sp}^2)} \quad (9)$$

$$\frac{\ddot{h}}{\delta} = \frac{A_h(1+ST_{h_2})(1+ST_{h_3})}{S^2+2\xi_{sp}\omega_{sp}S+\omega_{sp}^2} \quad (10)$$

where the two terms $T_{h_2}$ and $T_{h_3}$ are nearly equal, but are of opposite sign, they contribute little if any phase shift. Furthermore, $1/T_{h_2}$ and $1/T_{h_3}$ are nearly always greater than $\omega_{sp}$, and are typically between two and two and a half times $\omega_{sp}$. For this reason, they have very little effect on the outer control loops and may be neglected in the derivation of the $k$-equations. This leaves $$\frac{\ddot{h}}{\delta} = \frac{A_h}{S^2 + 2\xi_{sp}\omega_{sp}S + \omega_{sp}^2} \tag{11}$$

$$= \frac{\dot{\theta}}{\delta} \frac{A_h}{A_\theta} \frac{1}{1 + ST_{\theta_2}} \tag{12}$$

Figure 6:
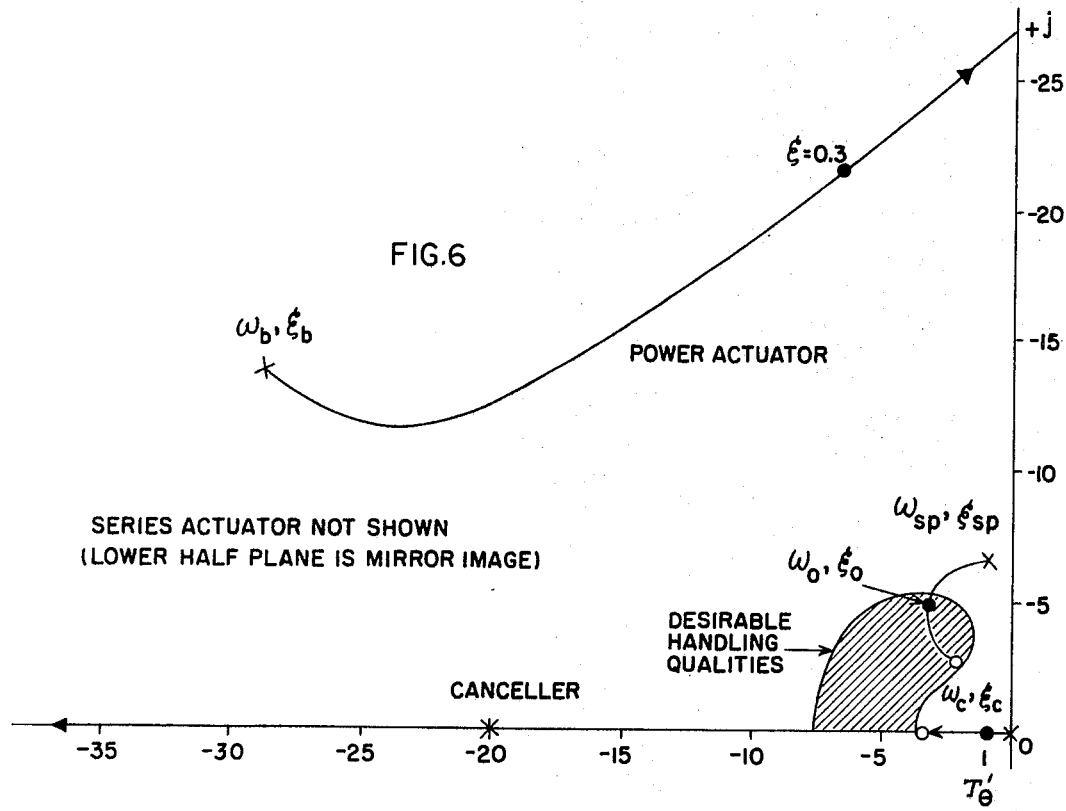

Since, in steady state conditions, $$\ddot{h} = v\dot{\theta}, \quad A_h/A_\theta = V$$

and $$\frac{\ddot{h}}{\dot{\theta}} = \frac{V}{1 + ST_{\theta_2}} \tag{13}$$

where V is the forward velocity. Allowable variation in short period natural frequency and damping for good handling qualities is shown in FIGURE 6.

The transfer function of the augmented aircraft (the combination of the aircraft and its stability augmentation system) are used in deriving the $k$-equations. This transfer function is based on the use of the control channel of FIGURE 1 and described hereinabove and is shown in FIGURE 7.

Figure 7:
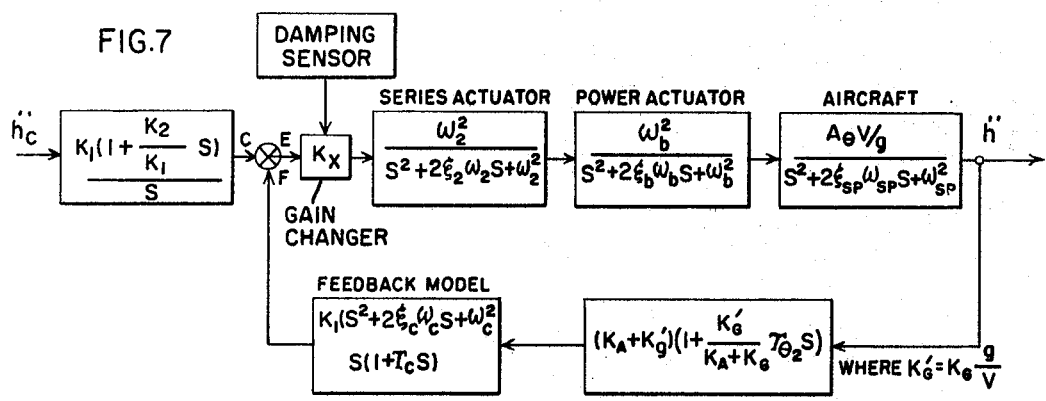

The open loop equation for the loop shown in FIGURE 7 is:

$$\frac{F}{E} = $$

$$\frac{K\left(S + \left(\frac{K_G' + K_A}{K_G'T_\theta}\right)\right)(S^2 + 2\xi_c\omega_c S + \omega_c^2)}{S(S^2 + 2\xi_{sp}\omega_{sp}S + \omega_{sp}^2)\left(S + \frac{1}{T_c}\right)(S^2 + 2\xi_b\omega_b S + \omega_b^2)(S^2 + 2\xi_a\omega_a S + \omega_a^2)} \tag{14}$$

where K is the product of all the gain terms after all roots have been converted to the forms $(s+a)$. The locus of the roots of the closed loop is shown in FIGURE 7.

Also shown is the area of desirable handling qualities. By proper selection of the canceller time constant ($T_c$), the feedback model frequency and damping ($\omega_c$, $\xi_c$), and the ratio of rate and acceleration feedback gains ($K_G$, $K_A$), the control mode closed loop root can be made to fall within the desirable handling qualities area. In order to make this closed loop root approach the model as nearly as possible, the loop gain is automatically adjusted to its maximum value, consistent with stable operation. To achieve this, a damping sensor is used to sense the damping ratio of the power actuator mode, and to adjust the loop gain so as to maintain, typically, 0.3 damping in this mode.

The complete closed loop transfer function is:

$$\frac{h}{c} =$$

$$\frac{K'S(1 + T_c S)}{(1 + T_\theta'S)\left(1 + \frac{2\xi_o}{\omega_o}S + \frac{S^2}{\omega_o^2}\right)(1 + T_c'S)\left(1 + \frac{2\xi_b'}{\omega_b'}S + \frac{S^2}{\omega_b'^2}\right)\left(1 + \frac{2\xi_a'}{\omega_a'}S + \frac{S^2}{\omega_a'^2}\right)} \tag{15}$$

where K' is the closed loop gain and the closed loop poles fall on the loci listed below:

Root $T_\theta$     From origin to $\frac{K_G' + K_A}{K_G'T_\theta}$ $\omega_o, \xi_o$     From $\omega_{sp}, \xi_{sp}$ to $\omega_o, \xi_o$ $T_c'$     From $T_c$ to $-\infty$ $\omega_b', \xi_b'$     Power actuator mode $\omega_a', \xi_a'$     Series actuator mode $1/T_c$, $1/T_c'$, $\omega_a'$, and $\omega_b'$ are all relatively high frequency compared to $\omega_o$, and do not need to be included in the transfer function used to derive the $k$-equations.

When these terms are dropped, the resulting overall closed loop transfer function is:

$$\frac{\ddot{h}}{\ddot{h}_c} = \frac{K'K_1\left(1 + \frac{K_2}{K_1}S\right)}{(1 + T_\theta'S)\left(1 + \frac{2S_o}{\omega_o} + \frac{S^2}{\omega_o^2}\right)} \tag{16}$$

Letting $K_g = K'K_1$ and adjusting $K_2/K_1$ to be nearly equal to $T_\theta'$, so these two terms cancel for all practical purposes, $$\frac{\ddot{h}}{\ddot{h}_c} = \frac{K_g}{1 + \frac{2S_o}{\omega_o}S + \frac{S^2}{\omega_o^2}} \tag{17}$$

Figure 8:
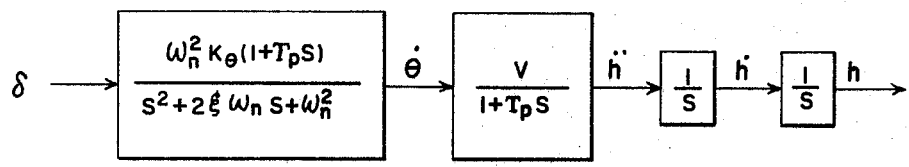

In accordance with Equations 11 and 12, the short period characteristics are represented by transfer functions of the form of Equations 18 and 19 and as shown in block diagram form in FIGURE 8.

$$\frac{\dot{\theta}}{\delta_e}(s) = \frac{K_\theta(1 + ST_p)}{S^2 + 2\xi\omega_n S + \omega_n^2} \tag{18}$$

$$\frac{\ddot{h}}{\dot{\theta}}(s) = \frac{V}{1 + ST_p} \tag{19}$$

The nomenclature has been modified slightly from the conventional symbols used in Equations 11 and 12 in order for simplification.

For the basic airplane, the control signal, $m(\sigma)$ in Equation 6, is stabilator deflection, $\sigma_e$. For this case, Equation 6 becomes $$E = \delta_e^{min}(\sigma) \int_\mu^{t+T} \{\phi_h[h_d(\sigma) - h(\sigma)]^2 + \phi_{\ddot{h}}[\ddot{h}(\sigma)]^2 + \phi_{\dot{\theta}}[\dot{\theta}(\sigma)]^2 + [m(\sigma)]^2\} d\sigma \tag{20}$$

The solution which is being sought is stabilator deflection, $\delta_e(\sigma)$, over the time interval from $\mu$ to $t+T$, such that the integral (Equation 20) is an absolute minimum, and such that the aircraft equations of motion implied by Equations 18 and 19 are satisfied.

Also, it may be noted that $$\frac{dh}{d\mu} = \dot{h} \tag{21}$$

$$\frac{d\dot{h}}{d\mu} = \ddot{h} \tag{22}$$

$$\frac{d\ddot{h}}{d\mu} = \dddot{h} \tag{23}$$

$$\frac{d\dddot{h}}{d\mu} = (\omega_o K_g^{1/2}) m(\mu) \tag{24}$$

In order that the expression $$\left(H + \frac{dE}{d\mu}\right)$$

be a minimum, a necessary condition is that:

$$\frac{\partial}{\partial m(\mu)}\left(H(\mu) + \frac{dE(\mu)}{d\mu}\right) = 0 \tag{25}$$

If the expressions for $H(\mu)$ and $dE/d\mu$ in terms of the state signals and the "$k$'s" are substituted into Equation 25 and operated on, an equation for the optimal control signal is found.

$$m^*(\mu) = \omega_o K_g^{1/2}[k_1 - k_{11}\dddot{h} - k_{12}\ddot{h} - k_{13}\dot{h} - k_{14}h] \tag{26}$$

Equation 26 structures the control system.

If $m^*(\mu)$ is substituted into Equation 6a, then the expression is minimum and therefore, $$0 = \left(H + \frac{dE}{d\mu}\right)^* \qquad a = \omega_0 K_g^{1/2}$$

$$0 = (k_0' - a^2 k_1^2 + \phi_h h_d) + \ddot{\ddot{h}}[-2k_1' - 2k_2 + 2a^2 k_1 k_{11}]$$
$$+ \ddot{h}[-2k_2' - 2k_3 + 2a^2 k_1 k_{12}] + \dot{h}[-2k_3' - 2k_4 + 2a^2 k_1 k_{13}]$$
$$+ h[-2k_4' - 2\phi_4 h_d + 2a^2 k_1 k_{14}] + (\ddot{\ddot{h}})^2[k_{11}' + 2k_{12} - a^2 k_{11}^2$$
$$+ \phi_g^{\cdot}] + (\ddot{h})^2[k_{22}' + 2k_{23} - a^2 k_{12}^2 + \phi_g] + (\dot{h})^2[k_{33}' + 2k_{34}$$
$$- a^2 k_{13}^2] + h^2[k_{44}' - a^2 k_{14}^2 + \phi_h] + \ddot{\ddot{h}} \ddot{h}[2k_{12}' + 2k_{22} + 2k_{13}$$
$$- 2a^2 k_{11} k_{12}] + \ddot{\ddot{h}} \dot{h}[2k_{13}' + 2k_{23} + 2k_{14} - 2a^2 k_{11} k_{13}] + \ddot{\ddot{h}} h[2k_{14}'$$
$$+ 2k_{24} - 2a^2 k_{11} k_{14}] + \ddot{h}\dot{h}[2k_{23}' + 2k_{33} + 2k_{24} - 2a^2 k_{12} k_{13}]$$
$$+ \ddot{h} h[2k_{24}' + 2k_{34} - 2a^2 k_{12} k_{14}] + \dot{h} h[2k_{34}' + 2k_{44}$$
$$- 2a^2 k_{13} k_{14}] \qquad (27)$$

Since Equation 27 must be zero for all combinations of the state-signals, the coefficients must each be zero. This leads to a set of 15 first order nonlinear differential equations. These are the $k$ equations.

$$-k_0' = -a^2 k_1^2 + \phi_h h_d \qquad (28)$$

$$k_1' = -k_2 + a^2 k_1 k_{11} \qquad (29)$$

$$k_2' = -k_3 + a^2 k_1 k_{12} \qquad (30)$$

$$k_3' = -k_4 + a^2 k_1 k_{13} \qquad (31)$$

$$k_4' = \phi_h h_D + a^2 k_1 k_{14} \qquad (32)$$

$$-k_{11}' = 2k_{12} - a^2 k_{11}^2 + \phi_g^{\cdot} \qquad (33)$$

$$-k_{22}' = 2k_{23} - a^2 k_{12}^2 + \phi_g \qquad (34)$$

$$-k_{33}' = 2k_{34} - a^2 k_{13}^2 \qquad (35)$$

$$-k_{44}' = -a^2 k_{14}^2 + \phi_h \qquad (36)$$

$$-k_{12}' = k_{22} + k_{13} - a^2 k_{11} k_{12} \qquad (37)$$

$$-k_{13}' = k_{23} + k_{14} - a^2 k_{11} k_{13} \qquad (38)$$

$$-k_{14}' = k_{24} - a^2 k_{11} k_{14} \qquad (39)$$

$$-k_{23}' = k_{33} + k_{24} - a^2 k_{12} k_{13} \qquad (40)$$

$$-k_{24}' = k_{34} - a^2 k_{12} k_{14} \qquad (41)$$

$$-k_{34}' = k_{44} - a^2 k_{13} k_{14} \qquad (42)$$

Several statements may be made about this set of equations.

(a) The double subscript $k$ Equations 33–42 are independent of the single subscript $k$ Equations 28–32 and therefore may be solved separately.

(b) The equations for $k_1, k_2, k_3, k_4$ are independent of (28) and therefore may be solved separately.

(c) The term $k_0$ is not needed to control the system and therefore Equation 28 need not be solved.

(d) The double subscript Equations 33–42 are independent of the desired flight path and therefore need only be solved once for any desired combination of $$\theta_\theta^{\cdot}, \theta_g, \theta_h, \xi, \omega_n, T_p, \text{ and } V$$

They would then be just time variable coefficients in the single-subscript $k$ equations.

(e) The boundary conditions on the set of differential equations may be deduced from Equation 6.

Since only the end conditions are known on the set of differential equations, they must be solved backwards from $\mu = t + T$, to $\mu = t$.

(f) The only double-subscript $k$'s which are required in order to solve Equations 29–32 are $k_{11}, k_{12}, k_{13}$, and $k_{14}$ which are also the only double subscript $k$'s needed in the control system of FIGURE 1. As a result, the other double subscript $k$'s need not be solved for unless they are needed in solving for $k_{11}, k_{12}, k_{13}, k_{14}$. The set of equations which must be solved reduces to the following: Equations 1 through 4, and;

$$0 = 2K_{12} - a^2 K_{11}^2 + \phi_g^{\cdot} \qquad (43)$$

$$0 = 2K_{23} - a^2 K_{12}^2 + \phi_g \qquad (44)$$

$$0 = 2K_{34} - a^2 K_{13}^2 \qquad (45)$$

$$0 = -a^2 K_{14}^2 + \phi_h \qquad (46)$$

$$0 = K_{22} + K_{13} - a^2 K_{11} K_{12} \qquad (47)$$

$$0 = K_{23} + K_{14} - a^2 K_{11} K_{13} \qquad (48)$$

$$0 = K_{24} - a^2 K_{11} K_{14} \qquad (49)$$

$$0 = K_{33} + K_{24} - a^2 K_{12} K_{13} \qquad (50)$$

$$0 = K_{34} - a^2 K_{12} K_{14} \qquad (51)$$

$$0 = K_{44} - a^2 K_{13} K_{14} \qquad (52)$$

The set of double subscript $k$ equations may now be solved for $K_{11}, K_{12}, K_{13}$, and $K_{14}$ in terms of $$\phi_h, \phi_g, \text{ and } \phi_g^{\cdot}$$

However, since the inner two feedback loops represent the augmented aircraft, $K_{11}$ and $K_{12}$ are already chosen from other considerations.

Figure 9:
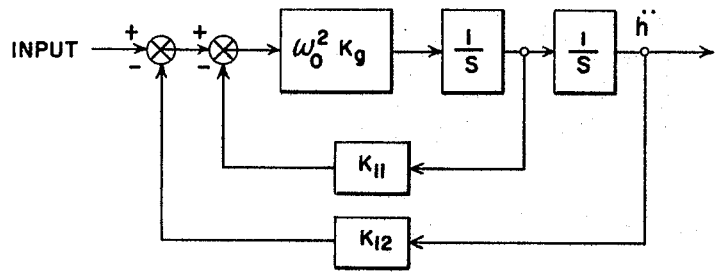

FIGURE 9 is reduced to the following transfer function:

$$G_1(S) = \frac{\omega_0^2 K_g}{S^2 + k_{11} \omega_0^2 K_g S + k_{12} \omega_0^2 K_g} \qquad (53)$$

if, $$k_{11} = \frac{2\xi_0}{\omega_0 K_g} \qquad (54)$$

and, $$k_{12} = \frac{1}{K_g} \qquad (55)$$

The transfer function of Equation 53 may be written as:

$$G_1(S) = \frac{\omega_0^2 K_g}{S^2 + 2\xi_0 \omega_0 S + \omega_0^2} \qquad (56)$$

$$\omega_0 = \omega_n \sqrt{1 + C_{11} K_\theta^2 \omega_n^2 T_p + C_{12} K_\theta^2 \omega_n^2 T_p V} \qquad (57)$$

$$\xi_0 = \frac{\xi + \frac{1}{2} C_{11} T p^2 K_\theta^2 \omega_n^3}{\sqrt{1 + C_{11} K_\theta^2 \omega_n^2 T_p + C_{12} K_\theta^2 \omega_n^2 T_p V}} \qquad (58)$$

$$K_g = \frac{K_\theta^2 V T_p \omega_n^2}{(1 + C_{11} K_\theta^2 \omega_n^2 T_p + C_{12} K_\theta^2 \omega_n^2 T_p V)} \qquad (59)$$

Specifying $K_g, \xi_0$, and $\omega_0$ of the augmented aircraft determines $k_{11}$ and $k_{12}$. This in turn puts constraints on the values of $$\phi_g^{\cdot}, \phi_g, \text{ and } \phi_h$$

by specifying two of them. This is demonstrated by considering the set of Equations 43–52. This set is reduced to a set of four equations involving $$K_{11}, K_{12}, K_{13}, K_{14}, \phi_h, \phi_g, \text{ and } \phi_g^{\cdot}$$

Three of these variables may be fixed arbitrarily which then specifies completely the other four. Two variables are now chosen by specifying $K_g, \omega_0$, and $\xi_0$. This leaves four equations in five unknowns;

$$K_{13}, K_{14}, \phi_h, \phi_g, \text{ and } \phi_g^{\cdot}$$

One of these unknowns is chosen arbitrarily and then the rest are uniquely determined.

It has been found in practice that the feedback gains provided by the self-adaptive control channel which the FIGURE 1 system utilizes are substantially the same as those required by the optimization. Accordingly, the prior-adaptive systems cited above require no modification of their feedback matrix for automatic terrain following. It is only necessary to add predictor 10. Furthermore, the desired feedback operation is independent of the particular terrain encountered. It has also been found that the system is inherently stable. Because the future interval over which the predictor operates is necessarily long compared with the aircraft response characteristics, stability inherently follows. Also, because the predictor operates on the basis of a functional model of the aircraft and its operation is in reverse time, the lag of the model inherently produces the proper lead in the anticipation command signals.

While particular embodiments of the invention have been shown and described herein, it is not intended that the invention be limited to such disclosure, but that changes and modifications can be made and incorporated within the scope of the claims.

What is claimed is:

1. A control system comprising:
   (a) input means for applying a signal to the controlled plant in accordance with a desired response;
   (b) a feedback matrix, responsive to sensors measuring plant states for modifying said input signal substantially in accordance with optimum performance characteristics;
   (c) a predictor, including a plurality of integrators and adjusted gain devices, for further modifying said input signal on the basis of an integration, in reverse time, of plant performance over a floating interval from a future time to present time.

2. A method of providing optimum control of a plant variable over a future interval of time comprising:
   (a) applying a control signal to the plant in accordance with a desired response;
   (b) sensing a condition variable to be encountered over a future floating interval of time;
   (c) processing signals representing the future condition variable by integrating these signals, in reverse time, in accordance with simulated plant characteristics so as to derive a signal representing the plant response lag for the particular set of future condition variable signals;
   (d) augmenting said control signal by said lag signal, in an inverted form, so as to provide a lead signal;
   (e) further augmenting said control signal in accordance with feedback signals, representing the instantaneous plant states, processed in accordance with the plant dynamics.

3. An optimized closed-loop control system comprising:
   (a) a source of input signals for the controlled plant in accordance with desired responses;
   (b) feedback means, responsive to sensors measuring plant states for modifying said input signals substantially in accordance with optimum performance characteristics;
   (c) a predictor having a signal processing model of the plant, including a plurality of integrators and adjusted gain devices, for further modifying said input signal on the basis of an integration, in reverse time, of plant performance over a floating interval from a future time to present time;
   (d) means for providing input signals to said predictor representing the desired response over the future interval.

4. A craft terrain following control system comprising:
   (a) a self-adaptive control channel for maintaining an aircraft at a predetermined height;
   (b) means for introducing a desired clearance height factor;
   (c) an altimeter, cooperating with said clearance height factor means, for generating a signal representing the predetermined height;
   (d) a terrain sensor for generating signals representing terrain height over a future interval along the aircraft flight path;
   (e) an equation solver, including a set of integrators and gain devices for predicting aircraft heights along the future interval, in reverse fast time, on the basis of known aircraft dynamics and optimized response characteristics.

5. A method of providing optimum terrain following control comprising:
   (a) applying a pitch control signal to the flight control channel in accordance with a desired height;
   (b) sensing the terrain to be encountered over a future floating interval of time;
   (c) processing signals representing the future terrain height by integrating these signals, in reverse time, in accordance with craft characteristics so as to derive a signal representing the craft response lag for the particular future terrain height signals;
   (d) augmenting said pitch control signals by said lag signal, in an inverted form, so as to provide a lead component signal;
   (e) sensing the instantaneous performance states of the craft;
   (f) processing said instantaneous state signals to provide feedback signals in accordance with craft dynamics.

6. A craft terrain following control system comprising:
   (a) a closed loop, self-adaptive control channel, for maintaining an aircraft at a predetermined height;
   (b) means for introducing a desired clearance height signal;
   (c) a radio altimeter, cooperating additively with said clearance height factor means, for generating a signal representing the predetermined height;
   (d) a forward looking radar terrain sensor for generating signals representing terrain height over a future interval along the aircraft flight path;
   (e) an equation solver having a signal processing model of the aircraft, including a set of integrators and adjusted gain devices for predicting aircraft heights along the future flight path, in reverse time, substantially faster than real-time, on the basis of known aircraft dynamics and optimized response characteristics;
   (f) a trajectory generator, responsive to said terrain sensor, for modifying the future height signals in accordance with selected height acceleration limits.

7. A craft terrain following system in accordance with claim 6, wherein:
   (g) said self-adaptive control channel includes feedback gain devices adjusted so as to minimize an error index representing performance requirements and constraints.

References Cited

UNITED STATES PATENTS 3,119,582   1/1964   Kaufmann _____ 343—7

RODNEY D. BENNETT, *Primary Examiner.*

CHESTER L. JUSTUS, *Examiner.*

T. H. TUBBESING, *Assistant Examiner.*